C. M. BLANCHARD.
WATER COOLING DEVICE FOR ENGINE PISTONS.
APPLICATION FILED APR. 7, 1916.

1,225,401.

Patented May 8, 1917.

INVENTOR:
Charles M. Blanchard
BY Albert H. Baker
ATTY.

UNITED STATES PATENT OFFICE.

CHARLES M. BLANCHARD, OF WILLOUGHBY, OHIO.

WATER-COOLING DEVICE FOR ENGINE-PISTONS.

1,225,401. Specification of Letters Patent. Patented May 8, 1917.

Application filed April 7, 1916. Serial No. 89,575.

*To all whom it may concern:*

Be it known that I, CHARLES M. BLANCHARD, a citizen of the United States, residing at Willoughby, in the county of Lake and State of Ohio, have invented a certain new and useful Improvement in Water-Cooling Devices for Engine-Pistons, of which the following is a full, clear, and exact description, reference being had to the accompanying drawings.

This invention relates to internal combustion engines and has for its general object the provision of a simple efficient device for cooling the piston by circulating water therethrough while running. In such cooling systems it is customary to provide telescoping tubes, one carried by the engine frame and the other by the piston and reciprocating therewith, but providing a constant water communication to the piston. In such devices great difficulty has been experienced in making the sliding joint of the telescoping tubes water-tight owing to the severe intermittent pressure due to the inertia of the water, commonly called "water pounding". This necessitates a very tight joint between the telescoping tubes at which point considerable friction results, and it has been found that leakage at the joint between the telescoping tubes can only be prevented by great difficulty and frequent attention.

In carrying out my invention I provide telescoping tubes leading to and from the piston, but I so arrange these tubes that the tubes leading to the piston are entirely inclosed within the water passage leading therefrom, whereby any leakage that may occur only permits a small amount of water to escape into the water flowing from the piston, thus doing no harm, and in this manner I am able to provide a comparatively loose slidable joint between these two tubes. To prevent leakage at the joint between the telescoping tubes for the water leading from the piston, I have so arranged the device that practically no water reaches this joint under ordinary circumstances and never under pressure.

Advantageous features of this invention are a great reduction of the friction between the telescoping tubes and the prevention of water leaking to the outside of these tubes.

My invention is hereinafter more fully described in connection with the accompanying drawings, and the essential characteristics are summarized in the claims.

Figure 1:
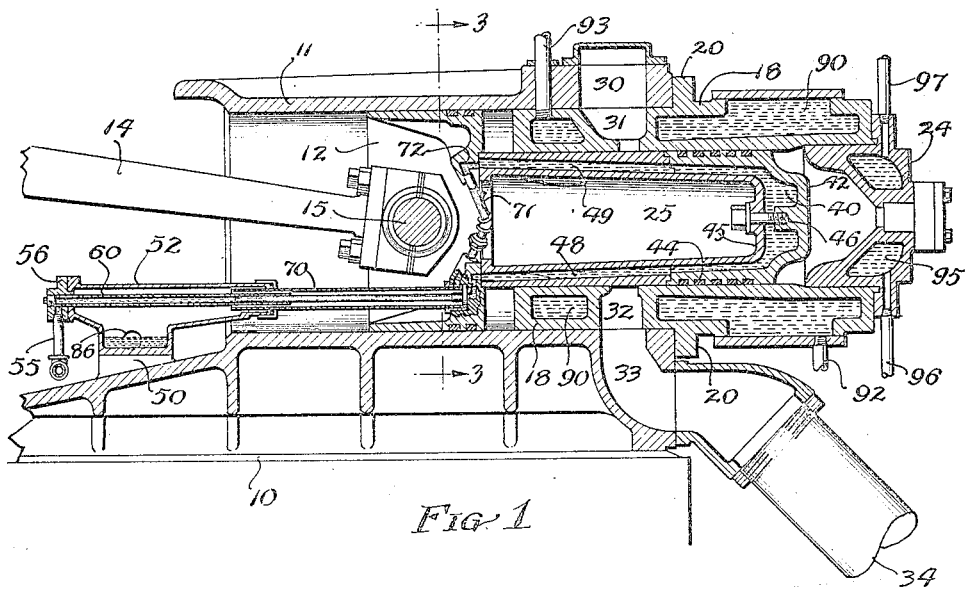
Figures 2, 3:
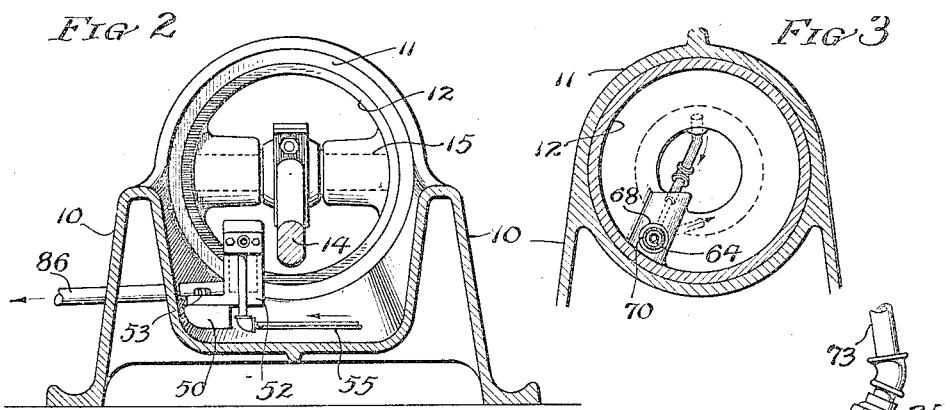
Figure 4:
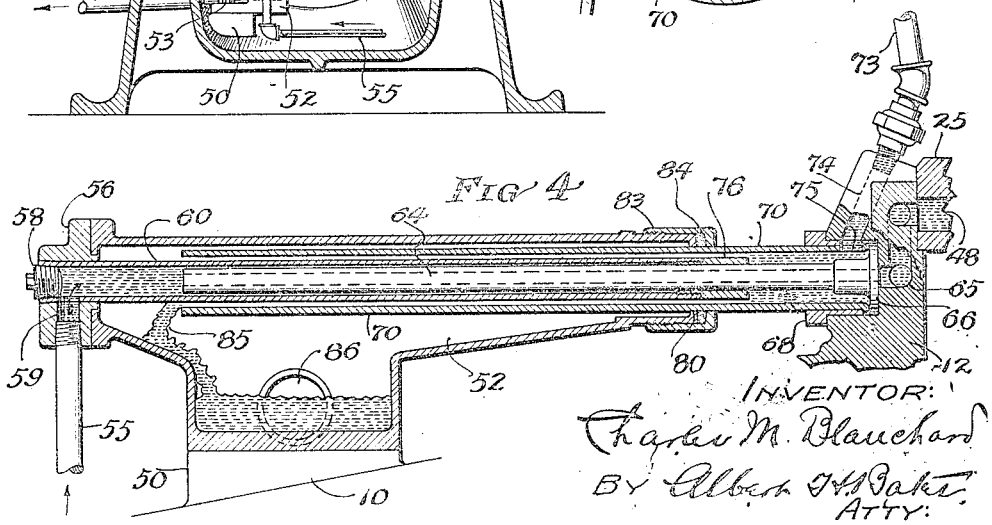

In the drawings, Figure 1 is a vertical longitudinal section through an internal combustion engine equipped with my piston cooling system; Fig. 2 is a vertical transverse section through the engine bed looking toward the piston and showing the arrangement of the water cooling device; Fig. 3 is a transverse section through the piston and a portion of the cylinder taken substantially on the line 3—3 of Fig. 1; Fig. 4 is an enlarged sectional detail of the water cooling device taken on the same plane as Fig. 1.

The type of engine shown in the drawings is one wherein there are two pistons of different diameters connected together and operating in communicating cylinder bores, the large piston being connected with the crank shaft. Referring to the parts by numerals, 10 indicates the engine frame, shown as integrally connected with a larger cylinder 11 having a comparatively large bore in which the piston 12 reciprocates. At 14 is indicated a suitable connecting rod having one end journaled on a wrist pin 15 suitably carried by the piston 12. Fitting into the bore of the larger cylinder is a cylindrical portion of a smaller cylinder 18, having an external flange 20 abutting the end of the larger cylinder and adapted to be secured thereto by suitable bolts, (not shown). The bore of the smaller cylinder extends clear through the same, the front end of the bore being slightly enlarged and closed by a suitable head 24.

The smaller piston 25 occupies the bore of the smaller cylinder and at its inner end is seated in a rabbet in the adjacent face of the larger piston 12 and secured thereto by any suitable means. As shown, register-ports are made through the overlapping walls of the two cylinders. Thus the admission port consists of a passageway 30 in the cylinder 11 registering with a passageway 31 in the cylinder 18 communicating with the interior of the smaller cylinder, and the exhaust port comprises a passageway 32 in the cylinder 18 and a communicating passageway 33 in the larger cylinder and engine frame which is shown as leading to a suitable exhaust pipe 34.

The piston is preferably provided with a water chamber 40 in the head thereof, which may be conveniently formed by making the head proper of the piston in the form of a cap 42 having a cylindrical wall portion provided with the usual piston rings 44. This cap meets the cylindrical wall of the piston at an intermediate point, the cap extending over an inner head portion 45 formed integral with the piston and leaving a space between the cap and head forming the chamber 40. The screw indicated at 46 may extend through the inner head of the piston and secure the cap portion or the head proper 42 in position. Leading to the chamber 40 is an inlet passage 48 preferably at the lower side of the piston, while at the upper side of the piston a passage 49 leads away from the chamber 40 to the inner end of the piston.

Water is led to and away from the chamber 40 through the passages 48 and 49 by the telescoping tubes and passages constructed according to my invention. These parts will now be described. On the bottom wall of the bed and at one side of the plane in which the connecting rod swings is provided a boss 50 on which is mounted a hollow casing 52, secured in position on this boss, by suitable bolts indicated at 53 and having an elongated portion extending longitudinally toward the cylinder. An inlet pipe 55 is shown as connected to a head member 56 secured to the casing and carrying a tube 60, extending inwardly along the longitudinal portion of the casing parallel with the direction of movement of the piston. One end of the tube 60 is rigidly secured in the head 56, and may be closed by a suitable plug indicated at 58. The head 56 is provided with a passage 59 through which water may flow from the pipe 55 through an opening in the tube 60 to the interior thereof.

Slidable within the tube 60 is a tube 64 adapted to lead water to a short passage 65 formed in the piston 12 and communicating with the passage 48 at the lower side of the piston 25. The tube 64 is rigidly carried by the piston 12, being provided with a flanged member 66 seating in a recess and held in position by a hollow plug 68, which also embraces a tube 70 which forms a portion of the exit passage. The plug 68 is suitably secured in position against a boss on the transverse wall of the piston 12, and the inner end of the tube 70 being flanged outwardly, is held against the flange 66 whereby this plug serves to hold the tubes 64 and 70 in position rigid with and movable by the piston 12.

Communicating with the end of the passage 49 is a short passage 72 formed in the piston 12 and through which water may flow to a pipe 73 leading across the end of the piston to a passage 74, and thence through an opening 75 in the tube 70, through this tube around the inner tube 60 and out into the casing 52.

The inside diameter of the tube 60 is such that it may extend loosely over the tube 64, and at the end thereof I have provided a collar 76 preferably of suitable non-friction metal having a reduced portion threaded into the end of the tube 60 and slidably embracing the tube 64. This sliding fit is preferably such that comparatively no friction is caused while allowing little or no leakage between this collar and the tube 64. It will be noted that if there is any leakage at this joint, the water will merely mingle with the water flowing away from the piston but will not drip over the engine parts as in devices heretofore used. Thus by providing this metal joint, so arranged that slight leaking is not detrimental, I may practically eliminate the friction between the rapidly telescoping tubes and avoid the use of ordinary packing at a point subject to the most severe use, thus making unnecessary frequent attention and replacing of packing.

The tube 70 slides through a contracted portion 80 of the casing 52 and if desired, the usual ring of packing 84 may be provided and held in position by a collar 83 threaded onto the casing, but this packing need not be tight as the water returning through the tube 70 flows from the end thereof, as indicated at 85 and thence outwardly through a pipe 86 communicating with the lower portion of the casing 52, and as this pipe 86 is very much larger than the inlet pipe, water will be drained off as fast as it comes to the casing 52 and will not rise in this casing to a point high enough to reach the joint at 80. The principal reason then for the packing at 84 is to wipe off water which may splash onto the tube 70 when the engine is running rapidly.

A more complete description of the operation of my cooling system is as follows: Water is brought from any suitable source to the pipe 55, and passes into the tube 60 and thence through the tube 64, passage 65 and into the passage 48 in the smaller piston, thence through the chamber 40 where it serves to cool the head of the piston as desired. The water then flows outwardly from the chamber 40 through the upper passage 49 (preferably at the highest point of the piston so that the chamber 40 may always remain full). From the passage 49 the water is led through the passage 72, pipe 73, passage 74 and opening 75 to the tube 70. The water passes through the tube 70 outside of the tube 60, and flows freely from the open end of the tube 70 into the casing 52 where it will be drained off through the pipe 86 which may lead to a sewer, or to a suitable cooler for the water from which it may be reused.

In the drawings I have shown the cylinder 18 as provided with a water jacket 90 which is supplied with water through a pipe 92, the water being led away from the jacket by a suitable pipe 93. If desired, the head of the cylinder may also be provided with a water jacket space 95, and pipes 96 and 97 may lead the water to and away from this space.

Having thus described my invention, what I claim is:

1. In a device for cooling a reciprocating piston, the combination with telescoping tubes leading to the piston, and a tube surrounding these tubes leading from the piston and reciprocable therewith, the sliding joint of the first mentioned tubes being within the latter tube.

2. In a device for cooling a reciprocating piston, the combination with telescoping tubes leading to the piston, a tube surrounding these tubes leading from the piston and rigid therewith, the joint of the first mentioned tubes being within the latter tube, and a receptacle for the tube leading from the piston, said receptacle having an exit opening larger than the inlet tubes.

3. In a device for cooling a reciprocating piston, the combination with telescoping tubes leading to the piston, and a tube rigid with and leading from the piston, a receptacle for the tube leading from the piston into which it may project, the receptacle having a large draining opening which may prevent water accumulating in the receptacle.

4. In a device for cooling pistons, the combination with a piston having a chamber at the head, passages leading to and from the chamber, a stationary casing, an inlet tube carried by said casing, a tube connected with the inlet passage of the piston and telescoping with the latter tube as the piston reciprocates, means for leading water to said tubes, a tube surrounding the telescoping tubes and adapted to project at all times into the casing and be reciprocated by the piston, the latter tube surrounding the telescoping tubes, and an exit opening leading from the casing larger in diameter than the inlet opening.

5. In a device for cooling pistons for internal combustion engines, the combination with a chamber in the piston, passages leading to and away from the same, a pair of telescoping tubes connected with one of said passages for leading water thereto, and a tube concentric with the other tubes connected with the other passage for leading the cooling water away from the piston, the latter tube at all times surrounding the sliding joint of the telescoping tubes whereby any water leaking at this joint may be carried away in the exit tube.

6. The combination with an engine, of telescoping tubes leading to the piston, a tube surrounding these tubes leading from the piston, and rigidly connected to the piston, the joint of the first mentioned tubes being within the latter tube, and a stationary casing secured to the engine frame and receiving the tube leading from the piston, said latter tube opening into the casing.

7. The combination with an engine, a piston and connecting rod, the piston being provided with a chamber at the head and passages leading to and from the chamber, a longitudinal casing positioned adjacent the connecting rod, a pair of telescoping tubes, one of which extends through the casing and is connected with an inlet, the other being connected with the piston for leading water thereto, a tube connected with the passage leading from the chamber surrounding the telescoping tubes and having its inner end open and adapted to reciprocate within said casing, and means for drawing water off from said casing preventing the same accumulating therein.

8. The combination with an engine having a piston and connecting rod, the piston having a chamber and passages leading to and from the chamber, a longitudinal casing mounted on the engine bed adjacent the plane in which the connecting rod swings, a pair of telescoping tubes leading to one of the passages in the piston, one of said tubes being rigidly carried by the casing and extending therethrough, a tube leading from the other passage of the piston having a sliding engagement with one end of said casing and surrounding the inlet tubes, the inner end of said surrounding tube being normally at all times within the casing, a receptacle formed in the casing below the tubes, and an exit passage from said receptacle larger in diameter than the inlet tubes.

In testimony whereof, I hereunto affix my signature.

CHARLES M. BLANCHARD.